United States Patent
Handurukande et al.

(10) Patent No.: US 9,729,404 B2
(45) Date of Patent: Aug. 8, 2017

(54) QUALITY OF SERVICE MONITORING DEVICE AND METHOD OF MONITORING QUALITY OF SERVICE

(75) Inventors: Sidath Handurukande, Athlone (IE); Anne-Marie Bosneag, Athlone (IE); Szymon Fedor, Athlone (IE)

(73) Assignee: Telefonaktieboalget LM Ericsson (publ), Stockholm (SE)

( * ) Notice: Subject to any disclaimer, the term of this patent is extended or adjusted under 35 U.S.C. 154(b) by 528 days.

(21) Appl. No.: 13/880,222

(22) PCT Filed: Oct. 19, 2010

(86) PCT No.: PCT/EP2010/065706
§ 371 (c)(1),
(2), (4) Date: Jun. 18, 2013

(87) PCT Pub. No.: WO2012/052053
PCT Pub. Date: Apr. 26, 2012

(65) Prior Publication Data
US 2014/0149581 A1    May 29, 2014

(51) Int. Cl.
*G06F 15/173* (2006.01)
*H04L 12/24* (2006.01)
(52) U.S. Cl.
CPC ...... *H04L 41/5003* (2013.01); *H04L 41/5009* (2013.01); *H04L 41/5032* (2013.01)
(58) Field of Classification Search
None
See application file for complete search history.

(56) References Cited

U.S. PATENT DOCUMENTS 6,941,358 B1 * 9/2005 Joiner et al. ............... 709/220
6,959,265 B1 * 10/2005 Candela .............. G06F 11/3409
370/254

(Continued)

FOREIGN PATENT DOCUMENTS

CN    1806457 A    7/2006
CN    1887010 A    12/2006
(Continued)

OTHER PUBLICATIONS

Search Report issued by the State Intellectual Property Office of People's Republic of China for Application No. 201080070781.1, Mar. 24, 2015.

(Continued)

*Primary Examiner* — Joshua Joo
(74) *Attorney, Agent, or Firm* — Baker Botts, LLP

(57) ABSTRACT

The invention provides a quality of service monitoring device (12) for use with a user equipment comprising a base platform (14); and an external communication module (24) adapted to receive from an external source one or more listener modules and/or detector modules for incorporation into the base platform (14). The base platform (14) is coupled to the external communication module (24) to receive one or more listener modules (20) and detector modules (22) and is adapted to install received modules to extend the functionality of the base platform (14) so as to perform the functionality of the installed modules. A corresponding method is provided. There is also provided a quality of service monitoring apparatus, for use on the network side, as well as a corresponding method.

26 Claims, 9 Drawing Sheets

(56) References Cited

U.S. PATENT DOCUMENTS

| | | | |
|---|---|---|---|
| 7,062,670 B1* | 6/2006 | Larsson | G06F 11/0709 709/223 |
| 7,954,098 B1* | 5/2011 | Martin | G06F 8/61 717/176 |
| 8,005,890 B2* | 8/2011 | Rachitsky | G06F 17/3089 709/202 |
| 9,077,479 B2* | 7/2015 | Kotrla et al. | |
| 9,158,649 B2* | 10/2015 | Bley | G06F 11/3409 |
| 2006/0146703 A1* | 7/2006 | Cha et al. | 370/229 |
| 2006/0218302 A1 | 9/2006 | Chia et al. | |
| 2008/0267087 A1 | 10/2008 | Beck et al. | |
| 2009/0030942 A1* | 1/2009 | Jiang | H04L 12/2602 |
| 2009/0122879 A1* | 5/2009 | Howe | H04L 12/2602 375/240.27 |
| 2009/0164550 A1* | 6/2009 | Rahrer | H04L 41/0677 709/202 |
| 2010/0043034 A1* | 2/2010 | Li | H04N 7/17318 725/87 |
| 2010/0238802 A1 | 9/2010 | Lei et al. | |
| 2011/0013516 A1* | 1/2011 | Black et al. | 370/236 |
| 2011/0161484 A1* | 6/2011 | Van Den Bogaert | H04L 43/0876 709/224 |
| 2011/0167067 A1* | 7/2011 | Muppirala | G06F 3/0659 707/740 |
| 2011/0307798 A1* | 12/2011 | Lezama Guadarrama | G06F 9/4443 715/744 |
| 2012/0072576 A1* | 3/2012 | Yumerefendi | G06F 11/3476 709/224 |
| 2014/0073291 A1* | 3/2014 | Hildner et al. | 455/411 |

FOREIGN PATENT DOCUMENTS

| | | |
|---|---|---|
| CN | 101188509 A | 5/2008 |
| EP | 1 619 917 | 1/2006 |
| WO | WO 2005060786 A1 | 7/2005 |
| WO | WO 2006/002597 | 1/2006 |
| WO | WO 2009/026802 | 3/2009 |

OTHER PUBLICATIONS

International Search Report for PCT/EP2010/065706 mailed Jan. 12, 2011.

M. Ribeiro et al., "An Architecture to Monitor QoS in a Policy-Based Network", Telecommunications, 2003, 10$^{th}$ International Conference on Feb. 23-Mar. 1, 2003, Feb. 23, 2003, pp. 138-143.

"End-to-End QoS Monitoring Tool Development and Performance Analysis for NGN" by Kim et al., 2006.

Broadband Forum Technical Report; TR-069; CPE WAN Management Protocol v1.1; Version: Issue 1 Amendment 2; Version Date: Dec. 2007, 2007.

* cited by examiner

QUALITY OF SERVICE MONITORING DEVICE AND METHOD OF MONITORING QUALITY OF SERVICE

This application is the U.S. national phase of International Application No. PCT/EP2010/065706 filed 19 Oct. 2010 which designated the U.S., the entire contents of which is hereby incorporated by reference.

TECHNICAL FIELD

The invention relates to a quality of service monitoring device and a method of monitoring quality of service. The invention may particularly relate to monitoring quality of service in a communication system environment.

BACKGROUND

In the current communication system environment a huge variety of devices on which to receive communication services are available to users. However, the devices differ greatly, including equipment such as laptops, netbooks, PCs, smart phones, Set-Top-Boxes (STBs), home gateways, gaming consoles, tablet devices, eReaders, digital photo frames, amongst many others.

Moreover, in the current communication system environment there is a great number of services available to users, and additionally a number of technical options to receive the same service as similar services are offered using a variety of different technologies.

As an example, even simple services such as the email service might be delivered using the Post Office Protocol (POP) or Internet Message Application Protocol (IMAP) together with Simple Mail Transfer Protocol (SMTP). However, after the success of the World Wide Web, email service is also delivered widely as a web-based solution using Hypertext Transfer Protocol (HTTP).

Another example of a service that may be offered using a variety of different technologies is Internet Protocol Television (IPTV). An IPTV service may be realized either based on a IP Multimedia Subsystem (IMS) solution or may be realised in a non-IP Multimedia Subsystem based solution. It may implemented on top of different technologies which make use of a combination of various protocols.

Moreover, in the digital TV domain, Hybrid IPTV is emerging and there are Set Top Boxes (STBs) which support both traditional IPTV and WebTV using access to Internet.

The operators who provide communication services and high-level end-user services are interested in monitoring the Quality of Service (QoS) that the end-user is receiving. The operator can gauge the service delivery quality level based on the result of this monitoring.

However, it is a daunting task for operators to come up with quality of service monitoring solutions in the light of the array of devices and services available in the current communication system environment.

The quality of service monitoring solutions are generally directed to monitoring the quality of service provided by a particular service, and they are generally based on network probes that give information about the traffic at different points in the network.

The present invention seeks to obviate at least some of the disadvantages of the prior art and to provide a method of monitoring quality of service and a quality of service monitoring system.

SUMMARY

In accordance with one aspect of the invention there is provided a quality of service monitoring device for use with user equipment. The QoS monitoring device comprises a base platform and an external communication module adapted to receive from an external source one or more listener modules and/or detector modules for incorporation into the base platform. The base platform is coupled to the external communication module to receive one or more listener modules and/or detector modules and is adapted to install thereon the received modules to extend the functionality of the base platform so as to perform the functionality of the installed modules.

In accordance with a second aspect of the invention there is provided a method of monitoring quality of service in a QoS monitoring device for use with user equipment. The monitoring device comprises a base platform and an external communication module coupled to the base platform. The method comprising the base platform receiving from the external communication module one or more listener modules and/or detector modules and installing the received modules to extend the functionality of the base platform so as to perform the functionality of the installed modules.

In accordance with a third aspect of the invention there is provided a quality of service monitoring apparatus comprising a store arranged for storing one or more listener modules for obtaining service quality data from traffic data relating to a monitored service passing through a network element and a store arranged for storing one or more detector modules. The detector modules using service quality data obtained by a listener module to form QoS reports. The QoS monitoring apparatus further comprises a QoS monitoring server adapted to send a listener module and/or a detector module to at least one remote QoS monitoring device for installation in a base platform of the at least one remote QoS monitoring device, to extend the functionality of the base platform so as to perform the functionality of the installed modules.

In accordance with a fourth aspect of the invention there is provided a method of monitoring quality of service in a QoS monitoring apparatus. The method comprises the steps of selecting from a store one or more of a listener module for obtaining relevant traffic data passing through a network element and/or selecting from a store one or more of a detector module to identify service quality problems using the data obtained by a listener module. The method also comprises sending the selected listener module and/or the detector module to at least one remote QoS monitoring device for installation in a base platform of the at least one remote QoS monitoring device to extend the functionality of the base platform so as to perform the functionality of the installed modules.

DETAILED DESCRIPTION

The invention will now be described with reference to embodiments shown in the accompanying drawings.

Embodiments of the invention provide a quality of service (QoS) monitoring solution for user equipment as well as for a network element that can be adapted easily to cover additional technologies or services.

Figure 1:
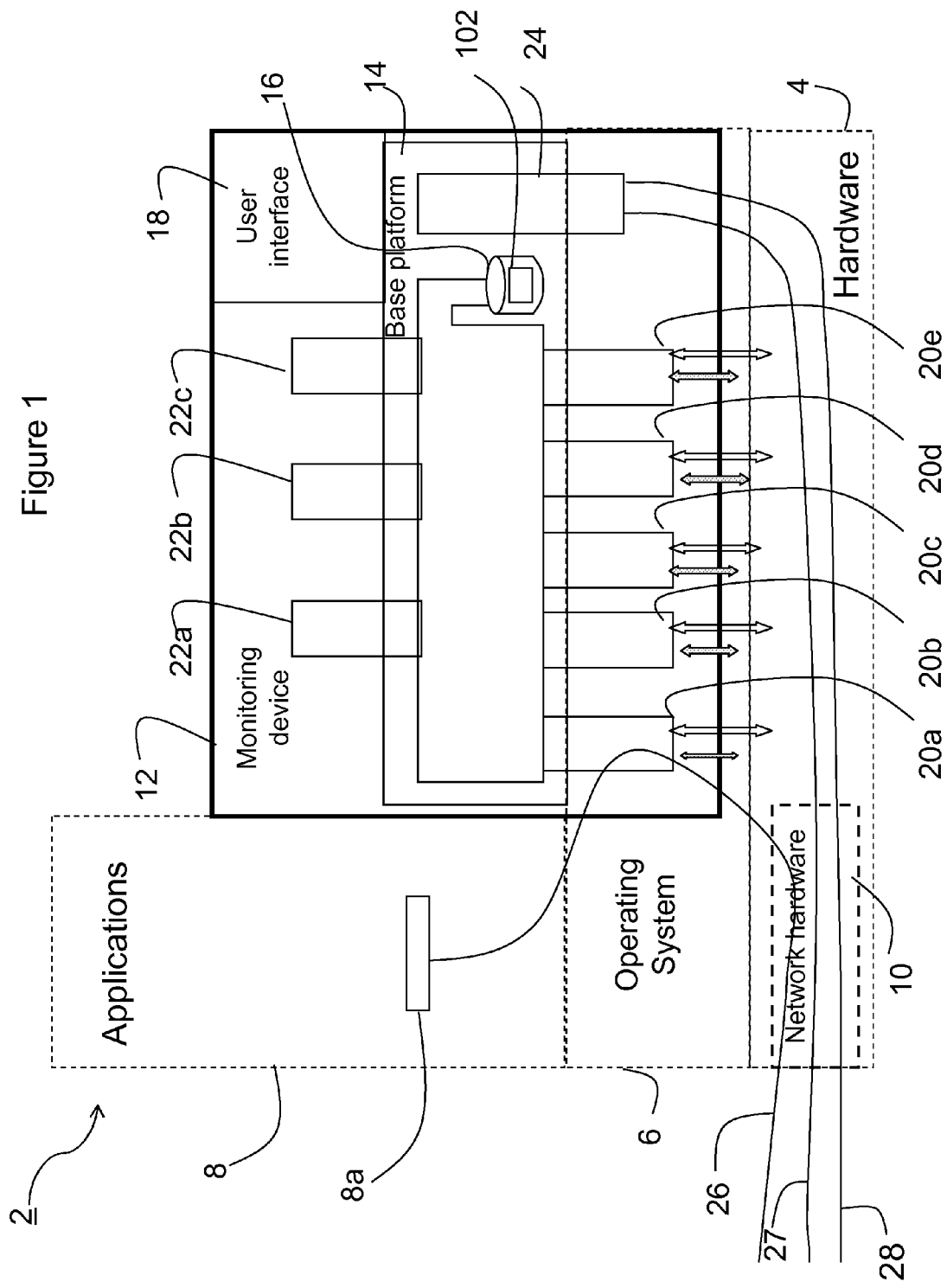
FIG. 1 shows an outline of the main components of an exemplary embodiment of a QoS monitoring device.

FIG. 1 shows an outline of the main components of an exemplary embodiment of the invention. Although embodiments may be used to monitor quality of service in any network element or device, as will be apparent to a skilled person, the exemplary embodiment is implemented in an edge device of the network, such as user equipment 2. The user equipment 2 is provided with hardware devices 4, an operating system OS 6 and at least one application 8, which, when operated together, provide one or more services to a user of the user equipment 2.

Some of the hardware devices 4 are network hardware devices 10, responsible for handing external communications, for example with communications networks. Typical network hardware devices are exemplified by, but not limited to, WiFi hardware, an Ethernet card or a 3G dongle.

The user equipment 2 is also provided with a Quality of Service monitoring device 12 in accordance with one embodiment of the invention. The user equipment 2 itself does not form part of the invention and as a result the elements 4-10 of the user equipment 2 described above are denoted by dashed lines.

In the exemplary embodiment the QoS monitoring device 12 comprises:
  a base platform 14 which controls and coordinates the internal actions, internal communication and external communication of the QoS monitoring device 12;
  a storage module 16 used during a monitoring operation;
  a user interface 18, which enables the QoS monitoring device 12 to communicate with the user of the user equipment 2;
  at least one listener module 20, which extends the functionality of the QoS monitoring device 12 when installed on top of the base platform 14;
  at least one detector module 22, which extends the functionality of the QoS monitoring device 12 when installed on top of the base platform 14; and
  an external communication module 24.

In one embodiment the functions of one listener module and one detector module are implemented in a single module.

The functions of these elements and the inter-relationship between these elements will be explained in more detail in the following description.

In the exemplary embodiment, the base platform 14 is implemented as a software module within the operating system (OS) 6 of user equipment 2. In the exemplary embodiment the base platform 14 together with other components provide a daemon service on the user equipment 2. In this specification the term "daemon" service is intended to refer to a service provided by a computer program that performs a particular task in the background rather than under the direct control of the user. Thus the base platform 14 monitors the quality of service, QoS, provided by a particular service running in the host equipment, in this case in the user equipment 2.

The base platform 14 controls the operation of the QoS monitoring device 12 and has access to a storage module 16 used by the monitoring device 12 during monitoring operation. In some embodiments the storage module 16 may comprise both volatile memory and non-volatile memory. Volatile memory (random access memory RAM) may be used as a shared data structure to enable communication between listener module 20 and detector module 22. Non-volatile memory used to store necessary information in the persistence memory. The volatile memory and the non-volatile memory space is allocated by the operating system 6 and the allocated memory is addressable by the QoS monitoring device 12.

The storage module 16 hosts a shared data structure that is used by the QoS monitoring device 12 during monitoring operation. The shared data structure will be explained in more detail with reference to FIG. 6.

In the exemplary embodiment the QoS monitoring device 12 is also provided with a user interface 18, which enables the base platform 14 to communicate with the user of the user equipment 2, as will be explained in more detail in the following description.

In use of the exemplary QoS monitoring device 12, the monitoring device 12 is also provided with at least one listener module 20. Each listener module 20 is coupled to the operating system OS 6 and/or network hardware 4 and/or device driver of the network hardware to listen passively to network traffic passing through the operating system OS 6 and network hardware 4. Each listener module 20 present in the monitoring device is matched to and adapted to monitor the type of user equipment 2 and the operating system 6 used in the user equipment 2 and/or to the network hardware devices 10 (e.g. 3G dongle, Ethernet interface, WiFi interface etc) to be monitored.

In some embodiments a listener module 20 may also communicate with the network hardware devices 10 of the user equipment to obtain various details (e.g., signal strength in 3G). As opposed to passive listening to passing traffic data, in this case information from the network hardware device is actively taken for QoS monitoring and correlating purposes where this is feasible and applicable. Such network device specific functionalities may be embedded in a network hardware specific listener module 20.

The exemplary embodiment of the QoS monitoring device 12 shown in FIG. 1 is provided with five listener modules 20a-20e each arranged to monitor traffic data communications in the user equipment 2 using a different communications technology. In the exemplary embodiment the monitoring device 12 is provided with:
  a WiFi listener module 20a;
  an Ethernet listener module 20b
  a point to Point Protocol (PPP) listener module 20c
  a USB listener module 20d; and
  a Bluetooth listener module 20e.

In the exemplary embodiment of the user equipment shown in FIG. 1, end user traffic 26 relating to a service being provided to an end user is shown passing through the WiFi listener module 20a when being exchanged between a service application, for example a service application 8a and the WiFi system hardware (not shown explicitly).

The exemplary monitoring device 12 is also provided with at least one detector module 22. Each detector module 22 is provided to monitor quality of service (QoS) for a particular service and includes all the analysis rule sets, patterns and heuristics relating to a given service. A detector module 22 uses the information gathered by a listener module 20 during a specific time period and the analysis rule sets, patterns and heuristics related to the given service to identify patterns that relate to specific QoS issues of that service, as will be explained in more detail below.

In some embodiments, the detector module 22 can identify quality of service problems such as access problems or content download speed in higher level services such as WebTV/YouTube. In some embodiments the detector modules can identify quality of service problems such as frequent disconnections in lower level network services such as mobile broadband network services.

The exemplary embodiment of the QoS monitoring device 12 shown in FIG. 1 is provided with three detector modules 22a-22c each arranged to monitor the QoS for a service.

The exemplary monitoring device 12 is also provided with an external communication module 24 which is arranged to communicate with an external Quality of Service (QoS) monitoring server (not shown in FIG. 1) under the control of the base platform 14, as will be explained in more detail in the following description. The external communication module 24 of the exemplary embodiment receives from the external Quality of Service (QoS) monitoring service at least re-configuration messages 27 and sends to the external Quality of Service (QoS) monitoring service at least QoS reports 28, as will become clear from a consideration of the following description.

In the exemplary embodiment the listener modules 20 and the detector modules 22 are both formed as a plug-in for the base platform 14. In this specification the term "plug-in" is intended to refer to a software component that adds specific capabilities to a larger software application, enabling customisation of the functionality of the larger software application. In this way, the use of listener module plug-in 20 and a detector module plug-in 22 extends the operation of the base platform 14 during operation of the exemplary embodiment.

In the exemplary embodiment, a listener module 20 appropriate to technology used by the user equipment 2 and a detector module 22 appropriate to services being provided to the user via the user equipment 2 are provided to the monitoring device 12 from an external QoS monitoring service (not shown in FIG. 1).

Thus, when a new hardware or technical capability is added to the user equipment 2, a corresponding listener module 20 may be added to the QoS monitoring device 12 to monitor the new network interface. When a new service is to be provided to a user by the user equipment 2, a corresponding detector module 22 may be added to the monitoring device 12 to monitor the QoS of the new service.

In this way, it will be clear to a skilled person that a flexible system is provided which can be generally adopted and which is adaptable to the specific and changing requirements of user equipment 2.

In some embodiments the listener modules 20 for different hardware arrangements and the detector modules 22 for different services are developed centrally and are then applied to the user equipment 2 as necessary. In some embodiments this may be achieved by download to the user equipment 2 of listener modules 20 and/or detector modules 22 appropriate to that user equipment 2 from a QoS monitoring service external to the user equipment.

The steps involved in updating the QoS monitoring device 12 with a listener module 20 and/or a detector module 22 in accordance with an exemplary embodiment will now be explained with reference to FIGS. 2-4.

Figure 2:
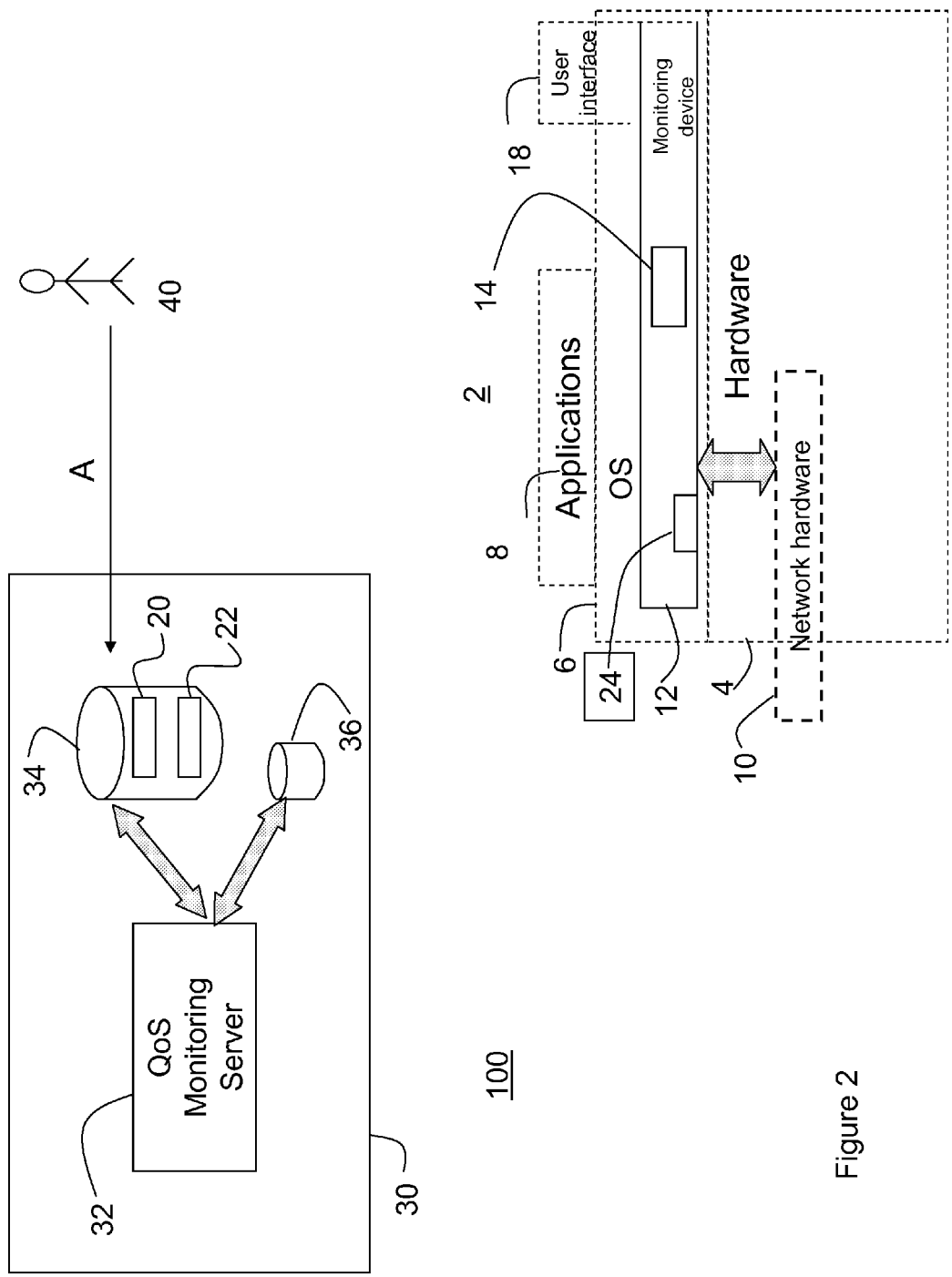
FIG. 2 illustrates a first step in a method of installing modules in the QoS monitoring device.
Figure 3:
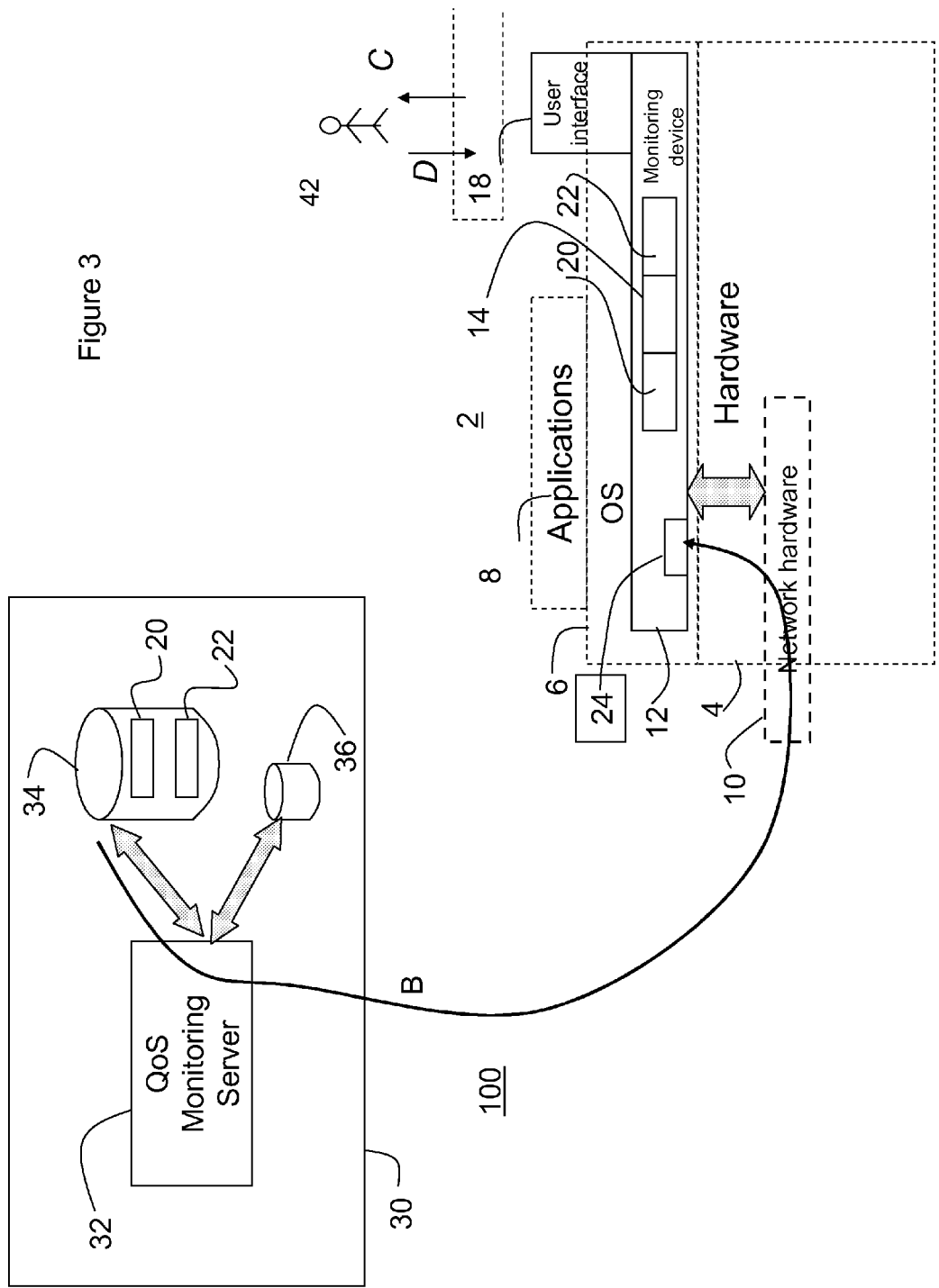
FIG. 3 illustrates a second step in a method of installing modules in the QoS monitoring device.
Figure 4:
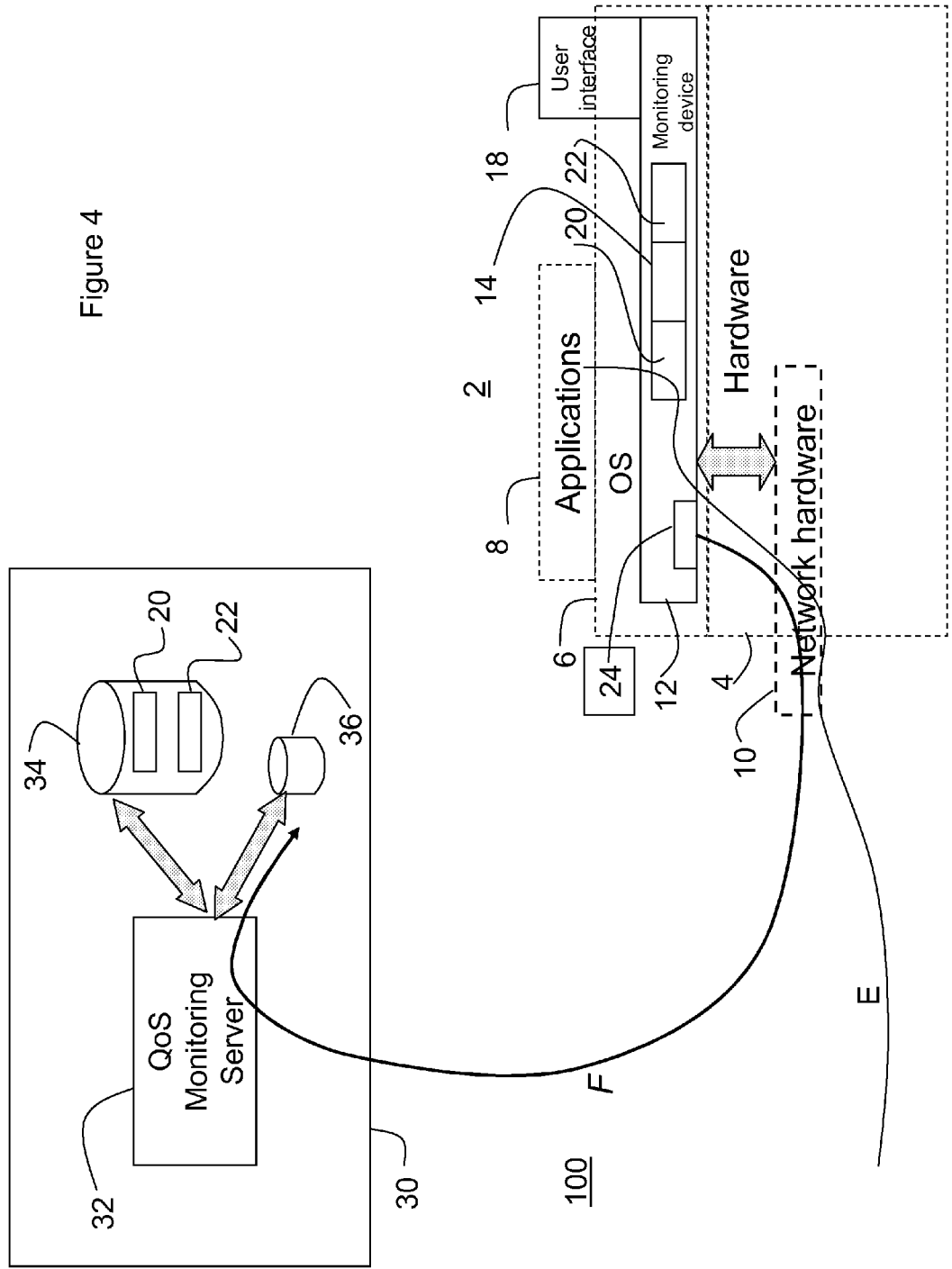
FIG. 4 illustrates a third step in a method of installing modules in the QoS monitoring device.

In FIGS. 2-4, user equipment 2 having a QoS monitoring device 12 as shown in FIG. 1 is provided. The same reference numbers have been used in FIGS. 2-4 for elements that are the same as or similar to corresponding elements in FIG. 1. In an initial stage as shown in FIG. 2, the monitoring device 12 of the user equipment 2 is provided with a base platform 14, but there are no listener modules 20 or detector modules 22 shown.

In FIGS. 2-4 a QoS monitoring service or system 100 having a QoS monitoring apparatus 30 and at least one QoS monitoring device 12 is shown. Elements of the user equipment 2 useful for explaining the operation of the embodiment are shown using dashed lines. In addition, the user interface 18 of the QoS monitoring device 12 may be omitted in some embodiments, and is therefore shown in dashed lines in FIG. 2.

The QoS monitoring apparatus 30 is provided with a QoS monitoring server 32; a module store 34; and a report store 36 associated therewith. In some embodiments the module store 34 and the report store 36 may be implemented using a database.

The module store 34 is arranged to store a plurality of listener modules 20 and/or detector modules 22, together with reconfiguration instructions/details and any meta-data or other information associated with the respective listener module or detector module (not shown separately). In the exemplary embodiment the listener modules 20 and the detector modules 22 and respective associated data are stored in the same module store 34, but other embodiments may be envisaged in which the listener modules 20 and the detector modules 22 are stored in separate module stores.

It is envisaged in the exemplary embodiment that the external communication module 24 of the QoS monitoring device 12 is able to communicate with the QoS monitoring server 32 via for example a communication network (not shown). The user equipment 2 may be coupled to a number of different networks using a number of different technologies, as will be apparent to a skilled person. Examples of this include but are not limited to a local area network (LAN) or a mobile communications system such as a network standardised by the $3^{rd}$ Generation Partnership Project (3GPP), or a WiFi network.

In a first stage, shown with reference to FIG. 2, listener modules 20 and/or detector modules 22 are prepared and are stored in the module store 34 of the QoS monitoring apparatus 30.

Thus, with reference to FIG. 2, typically, when a new technology or a new service is introduced or implemented in a network it is envisaged that a listener module 20 or a detector module 22 will be developed for the new technology or the new service respectively by a module developer 40. Generally, a range of modules that are suitable for the range of user equipment within the communication network in which the modules are to be implemented will be developed.

Each module created by the module developer 40, together with reconfiguration instructions for the base platform 14 and any meta-data or other information associated with the respective module, is stored in the module store 34 of the QoS monitoring apparatus 30 as shown by interaction A of FIG. 2.

In a second stage, shown with reference to FIG. 3, modules specific to a user equipment are transferred from the module store 34 of the QoS monitoring apparatus 30 and installed in the monitoring device 12 ready for monitoring to begin.

The external QoS monitoring server 32 maintains a knowledge base about the type of plug-in module that should be used for a particular user equipment depending for example on the operating system OS, network hardware and type of the computing device of the user equipment. This knowledge-base is built and maintained by a network operator either using human experts or using other software tools or using a mixture of the both.

As necessary, in the exemplary embodiment the QoS monitoring server 32 "pushes" the appropriate listener module 20 and/or detector module 22, together with respective necessary configuration details, towards the user equipment 2 and the base platform 14 of the QoS monitoring device 12 installs the modules with the user's consent in the exemplary embodiment.

Thus, with reference to FIG. 3, in interaction B a listener module 20 and/or a detector module 22, together with reconfiguration instructions/details and any meta-data or other information associated with the respective listener module or detector module, appropriate to the user equipment 2 can be sent to or downloaded to the QoS monitoring device 12, for example via a communications system to which the user equipment 2 has access. As will be apparent, in different embodiments this transfer may be initiated by the QoS monitoring server 32 or by the QoS monitoring device 12 of user equipment 2.

This transfer may be done remotely with minimal human intervention in a process similar to MS Windows updates. The necessary security mechanisms may also be handled by the base platform 14. These security measures are well studied in other contexts and are familiar to a skilled person and therefore will not be described in more detail.

In some embodiments permission for change in the QoS monitoring device 12 by installation of a listener module 20 or a detector module 22, may be sought from a user 42 in interaction C. This may be achieved for example by presenting relevant meta-data associated with the module to the user 42 via the user interface 18 of the QoS monitoring device 12. Permission for change in the monitoring device 12, for example by installation of a listener module 20 or a detector module 22, may be given by user 42 via the user interface 18 of the monitoring device 12 in interaction D.

The base platform 14 then installs the downloaded module and performs the necessary configuration according to the configuration details associated with the module. Thereafter, the operation of the base platform 14 is modified in accordance with the downloaded module. An exemplary listener module 20 and an exemplary detector module 22 are shown installed in the base platform 14 in FIGS. 3 and 4.

In the exemplary embodiment described with reference to FIG. 3, the permission of the user 42 is required before allowing the modification of the operation of the QoS monitoring device 12 caused by installation of a listener module 20 in the base platform 14 or installation of a detector module 22 in the base platform 14. However, in some embodiments a listener module 20 and/or a detector module 22 may be installed automatically, without requiring the user 42 to give permission. In these embodiments, a user interface 18 may not be required.

Finally, in a monitoring stage, the base platform 14 with the relevant installed listener module 20 and detector module 22 monitors the quality of service of an operating service. In the exemplary embodiment quality reports are sent to the external QoS monitoring server 32 of the QoS monitoring apparatus 30. Again, in some embodiments the user interface (18) can be used to obtain permission from the user for sending out the quality reports.

The interactions between system components during quality of service monitoring will be discussed in more detail with reference to FIG. 4.

When a service is being used, a service application (not shown) in the user equipment 2 communicates end user service traffic with third parties, for example a video messaging server (not shown), via a communications system. This interaction is shown as interaction E in FIG. 4 (corresponding to end user traffic 26 in FIG. 1). During the operation of the service, the QoS properties of the service can be monitored by the monitoring device 12 of the user equipment 2 and any QoS problems identified. In the exemplary embodiment QoS reports relating to the service provided by the user equipment can be sent to the external QoS monitoring server 32. This interaction is shown as interaction F in FIG. 4 (corresponding to QoS reports 28 in FIG. 1).

A protocol is required to forward the QoS reports from the monitoring device 12 to the QoS monitoring server 32. The protocol might specify the transport mechanism, for example whether to use HTTP or plain socket communication, and the timing schedule, for example the period or frequency of each report, whether reports are sent synchronously or asynchronously, and whether the QoS monitoring device 12 pushes the QoS reports to the QoS monitoring server 32 or whether the QoS monitoring server 32 pulls the QoS reports from the monitoring service 12 of the user equipment 2. In addition it is also necessary to specify the data structures that need to be maintained to facilitate the report forwarding. These implementation details may be determined by a person skilled in the art for different embodiments and may utilize existing protocols, and therefore will not be discussed in further detail.

As will be explained in more detail in the following description, QoS reports sent by the monitoring device 12 and stored by the QoS monitoring server 32 in the report store 36 may be accessed by human experts or by a QoS evaluation module (not shown) of the external QoS monitoring apparatus 30 to review the quality of services supplied to the user 42 of user equipment 2, for example to determine compliance with a service level agreement (SLA) and/or to alert the network or service operator of QoS issues.

Figure 5:
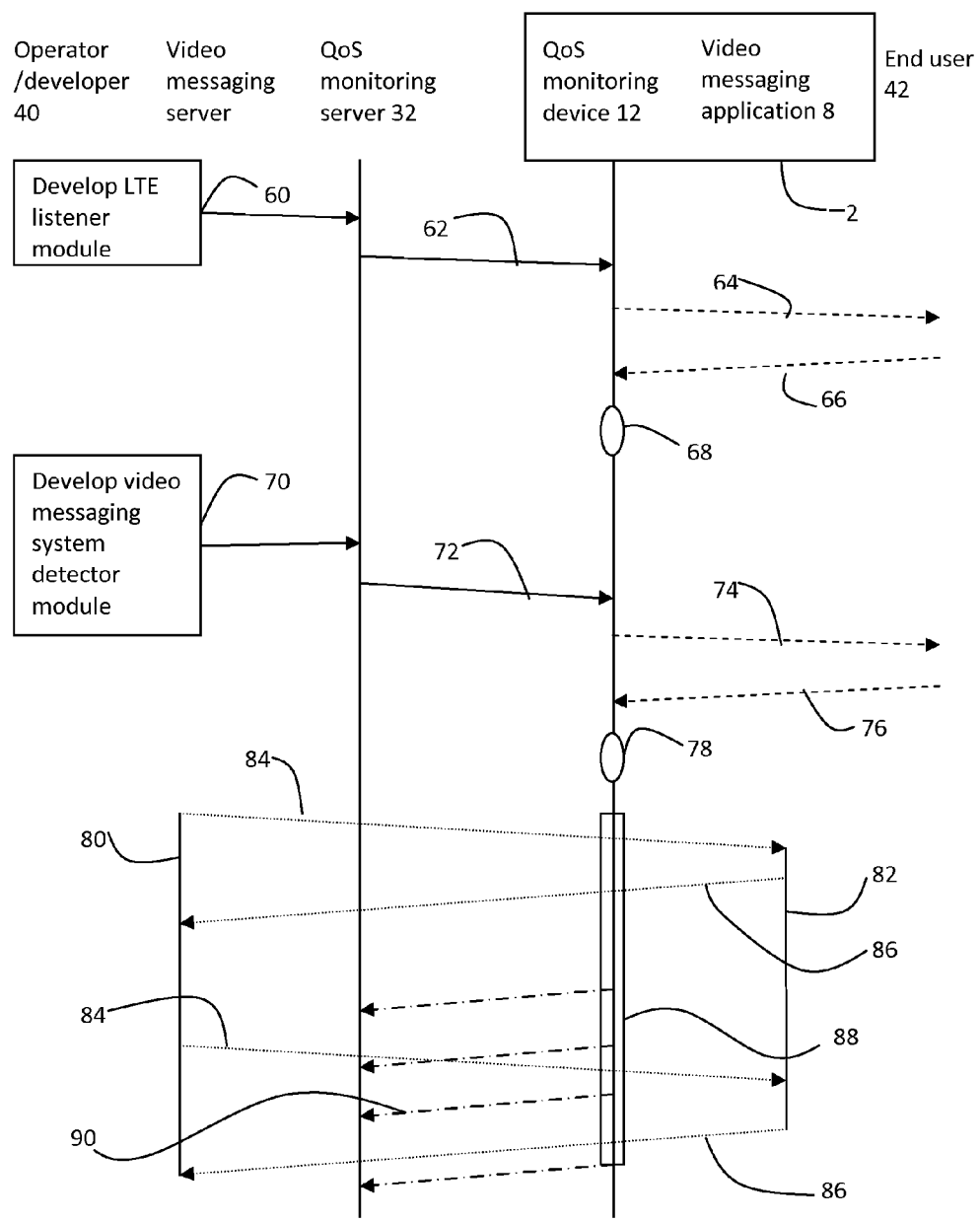
FIG. 5 illustrates a method of provisioning the monitoring system shown in FIGS. 1-4 with modules.

A method of provisioning the user equipment 2 in the arrangement shown in FIGS. 2-4 with a listener module 20 and a detector module 22 will now be described with reference to FIG. 5.

The example relates a scenario where a new network technology, for example Long Term Evolution (LTE) technology, is introduced and users start to use a new application, for example a new Video Messaging (VM) System. In this example the end-user uses a particular device, for example a Tablet device, which has a LTE dongle enabling use of the new Video Messaging application on the Tablet device.

In the first phase of the example, a LTE listener module that can monitor the traffic that flows through the LTE dongle is installed as a plug-in for the base platform 14 of the monitoring device 12. In FIG. 5, the steps that correspond to this phase are shown as steps 60-68.

In the second phase of the example, a VM detector module that can analyze and detect QoS problems related to the video messaging application is installed as a plug-in for the base platform 14 of the monitoring device 12. In FIG. 5, the steps that correspond to this phase are shown as steps 70-78.

In the third phase of the example, once the user uses the video messaging application, the VM detector module will analyze and detect QoS problems based on data gathered by the LTE listener module. This VM detector module, for example, can check whether a video message is downloaded within an acceptable time period. If not, a QoS problem with the video messaging application is detected. Any detected problems will be reported to the external QoS monitoring service 32 as they happen. In FIG. 5, the steps that correspond to this phase are shown as step 80-90.

In a first step in the exemplary method, in response to a new network technology, such as the long term evolution (LTE) network technology being implemented in the network and/or introduction of new hardware in the user equipment 2, module developers 40 might develop a number of listener modules for the new network technology, each suitable for use in a different user equipment, together with associated configuration information and meta-data. The developed listener modules with associated configuration information and meta-data are stored within the module store 34 of the external QoS monitoring apparatus 30 in step 60. One of the developed listener modules is a LTE listener module 20 for a LTE dongle on a tablet device.

In a second step 62, the listener module and associated configuration information and meta-data stored within the module store 34 of the QoS monitoring apparatus 30 appropriate to the user equipment 2 is downloaded to the monitoring device 12 of the user equipment 2. In the exemplary embodiment shown with reference to FIG. 1 the LTE listener module 22 and the associated configuration information and meta-data is downloaded to the user equipment 2 via the external communication module 24 of the monitoring device 12 under the control of the base platform 14.

In the exemplary embodiment, the QoS monitoring apparatus 30 determines that the LTE listener module 20 should be downloaded to the user equipment 2 and initiates the download. However, in other embodiments it is also possible that the monitoring device 12 initiates the download of the required LTE listener module 20 in response to the addition of new hardware or software to the user equipment 2, or the detection of a new technology used by the user equipment 2.

In step 64 the QoS monitoring device 12 requests permission from the end user 42 to install the LTE listener module 20 in the user equipment 2. Typically the base platform 14 might send an installation request message to the user 42 using the user interface 18. The installation request message may contain meta-data or other information associated with the LTE listener module 20 received from the module store 34 of the QoS monitoring apparatus 30.

In step 66 an installation permission message from end user 42 is received by the base platform 14 via the user interface 18, and the base platform 14 can then install the new LTE listener module 20, in step 68. The base platform 14 may use information or meta-data associated with the new module to install it. As mentioned previously, in the exemplary embodiment the listener module 20 is arranged as a plug-in to the base platform 14, and causes a modification to the operation of the base platform 14 so as to enable LTE communications to be monitored.

Next, in step 70, in response to a new service, such as a new video messaging service becoming available in the network, module developers 40 develop a number of detector modules for the new service each suitable for use in a particular user equipment using particular technologies, together with associated configuration information and meta-data. The detector modules, with associated configuration information and meta-data, are stored within the module store 34 of the QoS monitoring apparatus 30 in step 70. One of the developed modules is a detector module 22 for a video messaging system for an LTE dongle on a tablet device.

In a step 72, the detector module 22 and associated configuration information and meta-data stored within the module store 34 of the QoS monitoring apparatus 30 appropriate to the user equipment 2 is downloaded to the QoS monitoring device 12 of the user equipment 2. In the exemplary embodiment shown with reference to FIG. 1 the detector module 22 and associated configuration information and meta-data is downloaded to the monitoring device 12 of the user equipment 2 via the external communication module 24 of the user equipment 2 under the control of the base platform 14.

In the exemplary embodiment, the QoS monitoring server 32 determines that the detector module 22 should be downloaded to the user equipment 2, and initiates the download of the detector module 22. However, in other embodiments it is also possible that the QoS monitoring device 12 initiates the download of the required detector module 22, for example in response to the implementation of the new service on the user equipment 2.

In step 74 the monitoring device 12 requests permission from the end user 42 to install the detector module 22 in the user equipment 2. Typically the base platform 14 might send an installation request message to the user 42 using the user interface 18. The installation request message may contain meta-data or other information associated with the detector module 22 received from the module store 34 of the QoS monitoring apparatus 30.

In step 76 an installation permission message from end user 42 is received by the base platform 14 via the user interface 18, and the base platform 14 can then install the new detector module 22 in step 78. The base platform 14 may use information or meta-data associated with the new module to install it. As mentioned previously, in the exemplary embodiment the detector module 22 is arranged as a plug-in to the base platform 14, and causes a modification to the operation of the base platform so as to evaluate, using information gathered by the LTE listener module 20, the quality of service being provided to the user of the video messaging service.

A video messaging session between a video messaging server (not shown in FIGS. 1-3) and a video messaging application 8 of the user equipment is initiated using the LTE dongle. A video messaging session 80 is initiated at the video messaging server and a corresponding video messaging session 82 is initiated at the video messaging application 8 of the user equipment 2. During the video messaging session, messages 84 are sent from the video messaging server to the video messaging application 8, and messages 86 are sent from the video messaging application 8 to the video messaging server.

The messages 84 and 86 being exchanged between the video messaging server and the video messaging application 8 flowing through the LTE dongle of the user equipment are monitored in step 88 by the LTE listener module 20. The video messaging detector module 22 uses data gathered by the LTE listener module 20 to evaluate QoS of the video messaging service. In this exemplary embodiment, QoS reports 90 are sent periodically from the video messaging detector module 22 to the QoS monitoring server 32 of the QoS monitoring apparatus 30, and are stored for example in report store 36 for further analysis.

Figure 6:
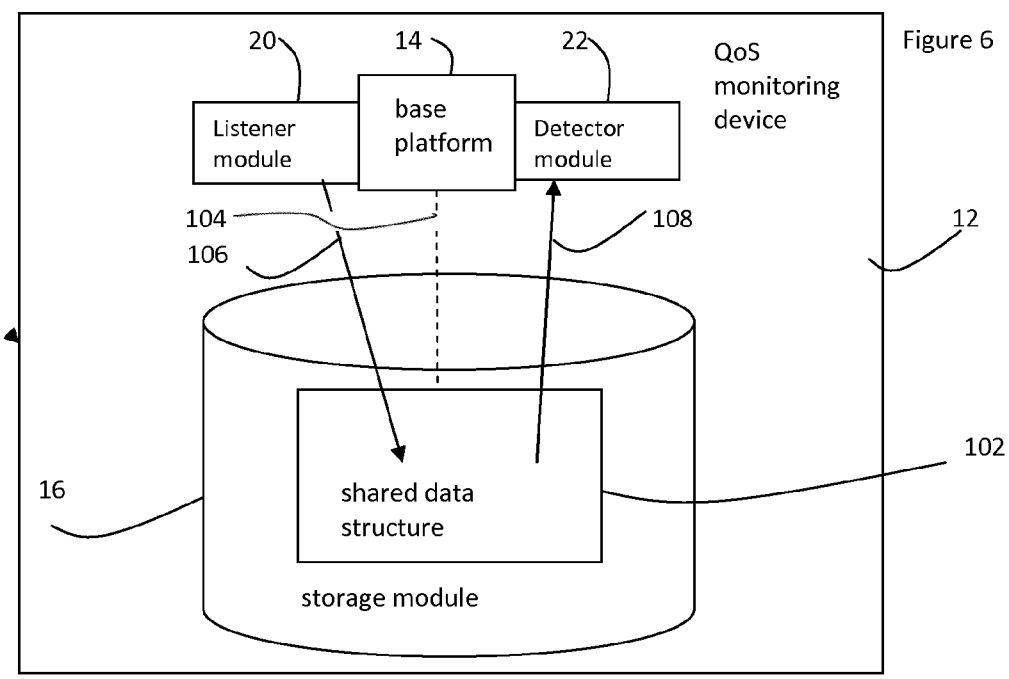
FIG. 6 illustrates the role of the shared data structure in the exemplary embodiment.

The interaction between a listener module 20 and a detector module 22 during quality of service monitoring will now be explained in more detail with reference to FIGS. 6 and 7. Elements corresponding to elements in FIGS. 1-5 have been given the same reference numerals.

The intercommunication and interface between a listener module 20 and a detector module 22 must ensure that information flows between the listener module 20 and the detector module 22 so that the QoS monitoring device 12 functions properly. In the exemplary embodiment the listener modules 20 and detector modules 22 can communicate using a shared data structure 102 within the storage module 16 shown in FIG. 6. The shared data structure 102 is maintained and managed by the base platform 14, as indicated in FIG. 6 by dashed line 104.

During a service monitoring operation in the exemplary embodiment, the listener module 20 and detector module 22 communicate with each other via the shared data structure 102 in the storage module 16.

Thus, in the exemplary embodiment the listener module 20 writes important and relevant information to the shared data structure 102 about the communications taking place through the network interface being monitored by the listener module 20 together with a time stamp and other necessary meta-information such as the name of the listener module 20. This action is shown by arrow 108 in FIG. 6.

In some embodiments, the listener module 20 writes to the shared data structure 102 all the information observed in the communications taking place through the network interface being monitored by the listener module 20. In other embodiments the listener module 22 might write only a selected set of observed information to the shared data structure 102. In some embodiments this can be achieved by allowing a detector module 22 to inform the listener module 22 of the type of information, for example the patterns of information in which the detector module is interested. In this case, the listener module 20 will not write all the observed information to the shared data structure 102 but the listener module 20 will write to the shared data structure 102 only the information or patterns in which the detector module 22 is interested.

In the exemplary embodiment, the detector module 22 reads out of the shared data structure 102 the information that has been written to the shared data structure 102 by the listener module 20. This action is shown by arrow 108 in FIG. 6. The detector module 22 looks for important details and patterns in the data and generates quality reports to be sent to the external QoS monitoring server 32 of the QoS monitoring apparatus 30 as described above. The details and patterns in the data are defined by the detector module developer 40 when developing the detector module 22 taking into consideration the service protocol being monitored and taking into consideration the possible errors that can arise when accessing the service.

In some embodiments the detector module 22 for a specific service analyses the service specific information, exemplified by but not limited to protocol handshake, request, responses, but not the network hardware specific information, exemplified by but not limited to collisions in Ethernet interface, signal strength of the 3G wireless signal. In some embodiments, the listener modules 20 writes network interface specific information such as collisions in the Ethernet interface, 3G signal strength to the shared data structure 102. In these embodiments, a detector module 22 can use this network interface specific information when finding the root causes of service impairments by correlating the information.

In the exemplary embodiment the base platform 14 periodically purges the "old" information from shared data structure 102 after waiting a sufficient length of time to enable detector modules 22 to read the information in the shared data structure 102. As a result, the shared data structure 102 will remain a finite size and will not grow indefinitely.

In some embodiments the base platform 14 might store a "digest" of the information in the shared data structure 102 into a persistence memory, for example a hard disk, for analysis when and if necessary for example when attending to a customer complaint. The information stored in the persistence memory will be purged after a longer time period, for example after a day.

The operation of an exemplary embodiment relating to a simple web-based scoreboard and commentary service for games, which may be suitable for example for games like football, cricket or baseball, will now be described with reference to FIG. 7. A user can use this service to follow a match and see the latest score of the match as well as text-based commentary.

Figure 7:
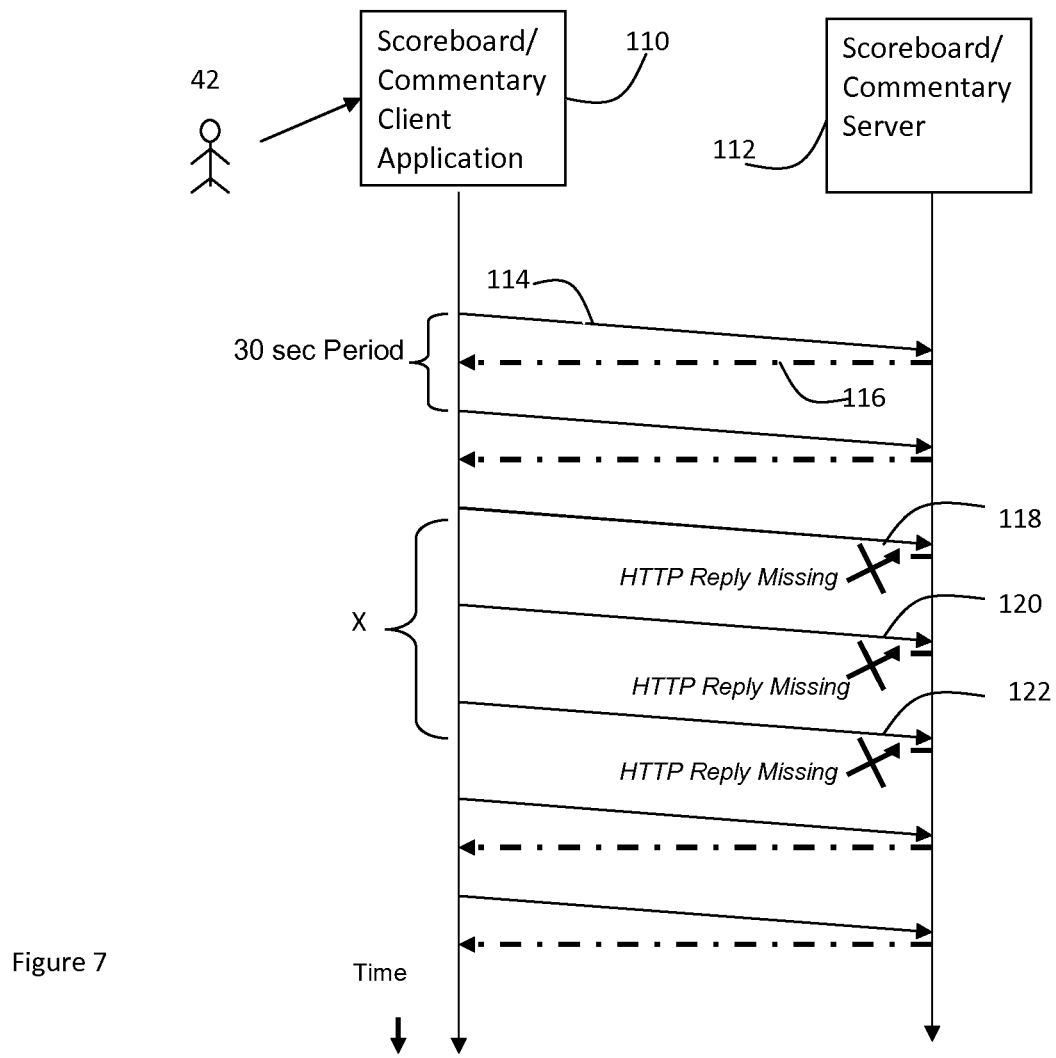
FIG. 7 shows a scoreboard/commentary client application in accordance with one arrangement.

Thus FIG. 7 shows an end user 42 running a scoreboard/commentary client application 110, for example as one of the application 8 on the user equipment 2 described above. A scoreboard/commentary server 112 is accessible via for example a WiFi connection. FIG. 7 shows the sequence of requests and responses between the scoreboard/commentary client application 110 and the scoreboard/commentary server 112.

During a game the latest score and the commentary are updated at the scoreboard/commentary server 112. In order to retrieve the score and commentary for display to the user 42 the scoreboard/commentary client application 110 sends a Hypertext Transfer Protocol (HTTP) request 114, requesting the latest score and commentary, to the scoreboard/commentary server 112 via for example the WiFi connection. In response, the scoreboard/commentary server 112 sends an HTTP reply 116 containing the score and commentary back to the scoreboard/commentary client application 110 via the WiFi connection.

This request and response cycle is repeated periodically in order to keep the score and commentary information presented to the user 42 by the scoreboard/commentary client application 110 up to date. In the exemplary embodiment shown in FIG. 7 every 30 seconds, a HTTP GET request 114 is sent to the scoreboard/commentary server 112 to fetch new information and in response, the scoreboard/commentary server 112 sends an HTTP reply 116 containing the score and commentary back to the scoreboard/commentary client application 110. Further requests and responses are shown in FIG. 7, but have not all been separately numbered, for clarity.

However, owing to problems exemplified by but not limited to a network overload, a server overload, or the connection being dropped or providing insufficient bandwidth owing to no signal or insufficient signal strength, it might happen that responses to HTTP requests do not arrive at the scoreboard/commentary client application 110.

The QoS monitoring device 12 of the user equipment 2 monitors the operation of the service. In the exemplary embodiment, the WiFi listener module 20 observes all the traffic that flows through WiFi network interface, including the HTTP requests 114 and corresponding HTTP replies 116. The listener module 20 writes the observed information to the shared data structure 102. The detector module 22 reads information from shared data structure 102 and observes the attempts to send HTTP requests 114 and to receive HTTP replies 116 from the information stored in the shared data structure 102 by the listener module 20.

During the time period X in FIG. 7, from the information stored in the shared data structure 102 by the listener module 20, the detector module 22 can determine that there were HTTP requests 118, 120, 122 did not receive a reply. The failure to receive a reply indicates an impairment to the Scoreboard/Commentary service and so the detector module 22 detects service impairments of Scoreboard/Commentary service. A QoS report can then be sent to the QoS monitoring server 32 of the QoS monitoring apparatus 30.

In this exemplary embodiment it is clearly seen how the service impairment is detected by a detector module 22 using the information written to the shared data structure (SDS) 102 by the listener module.

Figure 8:
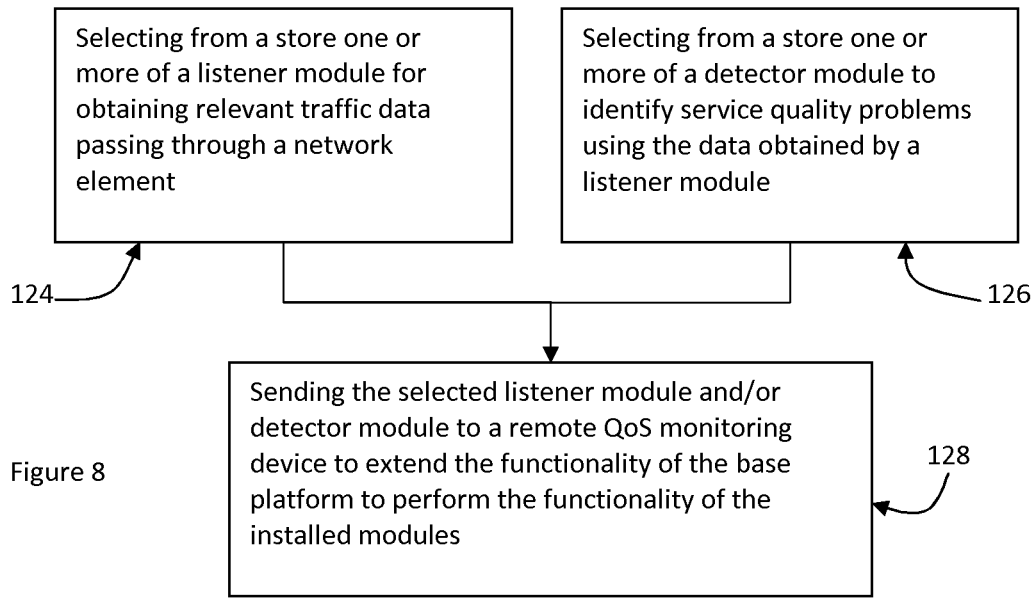
FIG. 8 is a flow chart summarizing a method of monitoring quality of service in a QoS monitoring apparatus.

FIG. 8 is a flow chart summarizing a method of monitoring quality of service in a QoS monitoring apparatus 30.

In a first step 124 one or more of a listener module for obtaining relevant traffic data passing through a network element is selected from a store.

And/or in a second step 126 one or more of a detector module to identify service quality problems using the data obtained by a listener module to form QoS reports is selected from a store.

In a third step 128 the selected listener module 20 and/or detector module 22 are sent to a remote QoS monitoring device 12 to extend the functionality of the base platform to perform the functionality of the installed modules.

Figure 9:
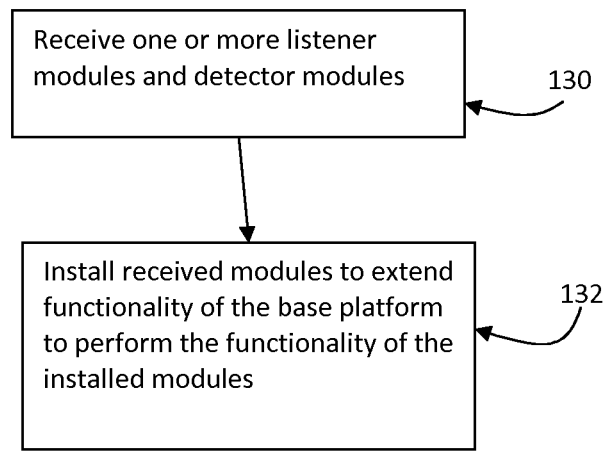
FIG. 9 is a flow chart summarizing a method of monitoring quality of service in a QoS monitoring device associated with a network element, during an initialisation phase.

FIG. 9 is a flow chart summarizing a method of monitoring quality of service in a QoS monitoring device 12 associated with a network element, during an initialisation phase.

In a first step 130 one or more listener modules and/or detector modules are received. In a second step 132 the received modules are installed to extend functionality of the base module.

Figure 10:
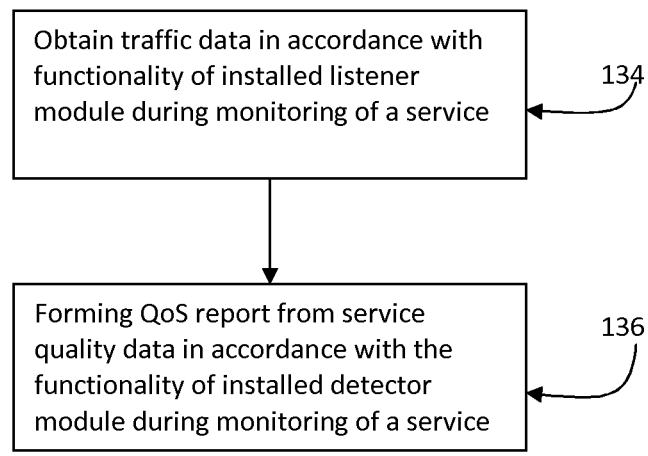
FIG. 10 is a flow chart summarizing a method of monitoring quality of service in a QoS monitoring device associated with a network element, during monitoring of a service.

FIG. 10 is a flow chart summarizing a method of monitoring quality of service in a QoS monitoring device 12 associated with a network element, during monitoring of a service.

In a first step, 134, traffic data is obtained in accordance with the functionality of installed listener module.

In a second step, 136, a QoS report is formed from service quality data in accordance with the functionality of installed detector module.

Therefore it can be seen that embodiments of the present invention provide a method and a system that enable easy deployment of a QoS reporting service at the end-user equipment.

In some embodiments, the provision of listener modules and detector modules enables the task of network monitoring to be separated from the task of service monitoring. Listener modules overcome the difficulty of handling various types of network technologies and network devices. The detector modules overcome the problems in monitoring various diverse types of services. The detector and listener modules need to be implemented only once, for the given service and for the specific device respectively. For example, when a new service appears, the operator with the help of a human expert can develop necessary QoS analyzing patterns and heuristics for the new service and develop the necessary module for the new service. A given detector module "bundles" all the analysis rule sets, patterns and heuristics related to a given service.

In some embodiments the listener modules and detector modules for each user equipment are independently distributed by a QoS server to the end-user devices. As a result, embodiments enable a service provider to monitor the quality of its service independently of:

(1) the type of end-user device that is consuming the service;

(2) the type of networking technology used (e.g., Asymmetric Digital Subscriber Line (ADSL), and the 3GPP Long term Evolution (LTE); and (3) the type of operating system used by the network device, for example an end user device or Home Gateway (HGW).

In some embodiments the QoS monitoring device may be remotely maintained in a semi automated way with minimal human intervention.

In embodiments the end-user application, exemplified by but not limited to a WebTV client, Browser or VoIP client, does not need to be modified for the monitoring device to function. It is a very flexible solution that can accommodate new services as well as new technologies by development and deployment of plug-in modules designed to handle monitoring and analysing operations relates to these new services and technologies.

Moreover, in some embodiments monitoring close to the end-user provides a better view on the user experience.

Modifications and other embodiments of the disclosed invention will come to mind to one skilled in the art having the benefit of the teachings presented in the foregoing description and the associated drawings. Therefore it is to be understood that the invention is not to be limited to specific embodiments disclosed and that modifications and other embodiments are intended to be included within the scope of this disclosure. Although specific terms may be employed herein, they are used in a generic and descriptive sense only and not for the purposes of limitation.

The invention claimed is:

1. A non-transitory computer-readable medium storing instructions for monitoring a quality of service (QoS) in a user equipment, the instructions executable by at least one processor of the user equipment to cause the at least one processor to:

receive from an external source a plurality of plug-in modules for incorporation into a base platform of an operating system on the user equipment, the plurality of plug-in modules of a type for the operating system on the user equipment, each of the plurality of plug-in modules operable to monitor traffic data communications using a different communications technology in the user equipment; and install the plurality of plug-in modules to the base platform operating on the user equipment, wherein the type of the plurality of plug-in modules causes a modification to an operation of the base platform of the operating system of the user equipment; and determine the QoS provided by a particular service running on the user equipment based on the monitoring of traffic data communications by a particular one of the plurality of plug-in modules.

2. The non-transitory computer-readable medium as claimed in claim 1 wherein, when determining the QoS provided by the particular service, the instructions are further executable by the at least one processor to cause the at least one processor to obtain traffic data in accordance with a functionality of the particular one of the plurality of plug-in modules.

3. The non-transitory computer-readable medium as claimed in claim 2 wherein the traffic data is obtained from a network hardware device in accordance with the functionality of the particular one of the plurality of plug-in modules specific to the network hardware device.

4. The non-transitory computer-readable medium as claimed in claim 2 wherein the instructions are further executable by the at least one processor to cause the at least one processor to extract service quality data from the traffic data and use the service quality data to form a QoS report.

5. The non-transitory computer-readable medium as claimed in claim 4 wherein the instructions are further executable by the at least one processor to cause the at least one processor to extract the service quality data from the traffic data and use the service quality data to form the QoS report in accordance with the functionality of a particular one of the plurality of plug-in modules that is specific to the particular service being monitored.

6. The non-transitory computer-readable medium as claimed in claim 2 wherein the instructions are further executable by the at least one processor to cause the at least one processor to store the traffic data from the plurality of plug-in modules.

7. The non-transitory computer-readable medium as claimed in claim 5 wherein the instructions are further executable to cause the at least one processor to extract and maintain a shared data structure for storing service quality data.

8. The non-transitory computer-readable medium as claimed in claim 4 wherein the instructions are further executable to cause the at least one processor to send the QoS report to a QoS monitoring apparatus.

9. The non-transitory computer-readable medium as claimed in claim 1 wherein the instructions are further executable by the at least one processor to cause the at least one processor to receive configuration information or metadata relating to the plurality of plug-in modules together with the plurality of plug-in modules.

10. The non-transitory computer-readable medium as claimed in claim wherein the instructions are further executable by the at least one processor to cause the at least one processor to:
request permission, via a user interface, to install the plurality of plug-in modules such that installation is not carried out until a positive response is received; and
request via the user interface permission to send a QoS report to a QoS monitoring apparatus.

11. The non-transitory computer-readable medium as claimed in claim 10 wherein the instructions are further executable by the at least one processor to cause the at least one processor to:
request user consent prior to installing the plurality of plug-in modules.

12. The non-transitory computer-readable medium as claimed in claim 1, wherein the user equipment comprises a set top box providing the particular service.

13. A method of monitoring quality of service, QoS, in a user equipment, the method comprising the steps of:
receiving from an external source a plurality of plug-in modules for incorporation into a base platform of an operating system on the user equipment, the plurality of plug-in modules of a type for the particular operating system on the user equipment, each of the plurality of plug-in modules operable to monitor traffic data communications using a different communications technology in the user equipment; and
installing the plurality of plug-in modules to extend a functionality of the base platform operating on the user equipment, wherein the type of the plurality of plug-in modules causes a modification to an operation of the base platform of the operating system of the user equipment; and
determine the QoS provided by a particular service running on the user equipment based on the monitoring of traffic data communications by a particular one of the plurality of plug-in modules.

14. The method of monitoring quality of service as claimed in claim 13 further comprising the step of obtaining traffic data in accordance with a functionality of the plurality of plug-in modules during monitoring of the QoS provided by the particular service.

15. The method of monitoring quality of service as claimed in claim 14 further comprising the step of using the traffic data to obtain service quality data to form a QoS report in accordance with the functionality of the plurality of plug-in modules during monitoring of the QoS provided by the particular service.

16. The method of monitoring quality of service as claimed in claim 15 further comprising the step of creating and maintaining a shared data structure for storing the service quality data in a storage module.

17. The method of monitoring quality of service as claimed in claim 15 further comprising the step of sending the QoS report to a QoS monitoring apparatus.

18. The method of monitoring quality of service as claimed in claim 13 further comprising the steps of: requesting via a user interface permission to install the plurality of plug-in modules, and only carrying out the installation in response to a positive response being received; and requesting via the user interface permission to send the QoS report to a QoS monitoring apparatus.

19. The method of monitoring quality of service as claimed in claim 18 further comprising requesting user consent prior to installing the plurality of plug-in modules.

20. The method of claim 13, wherein the user equipment comprises a set top box providing the particular service.

21. A quality of service, QoS, monitoring apparatus comprising:
a memory stewing a plurality of modules for monitoring traffic passing through user equipment, the traffic relating to a particular service provided by the user equipment, each of the plurality of modules being associated with a particular one of a plurality types of operating systems;
a QoS monitoring server having access to the memory, the QoS monitoring server operable to:
determine that the user equipment has requested or used a new technology, the user equipment having a particular type of operating system;
select two or more modules from the plurality of modules, the selected two or more modules being associated with the operating system on the user equipment, each of the selected two or More modules being operable to monitor traffic data communications using a different communications technology in the user equipment;
send the two or more modules to the user equipment for installation in a base platform of the operating system of the user equipment, the two or more modules extending a functionality of the base platform of the operating system so as to provide for the monitoring of the QoS of the particular service provided by the user equipment.

22. The QoS monitoring apparatus as claimed in claim 21, wherein the memory is further operable to store quality of service reports containing QoS information received from the user equipment.

23. The QoS monitoring apparatus as claimed in claim 21, wherein the user equipment comprises a set top box providing the particular service.

24. A method for monitoring quality of service (QoS) by a QoS monitoring server, the method comprising the steps of:
   determining that a user equipment having a particular type of operating system has requested or used a new technology;
   selecting from a memory two or more modules from a plurality of modules for obtaining traffic data associated with traffic passing through the user equipment, the selected two or more modules being associated with the operating system on the user equipment, each of the selected two or more modules being operable to monitor traffic data communications using a different communications technology in the user equipment; and
   sending the two or more modules to the user equipment for installation in a base platform of the operating system of the user equipment, to extend a functionality of the base platform of the operating system so as to provide for the monitoring of the QoS of the particular service provided by the user equipment.

25. The method of quality of service monitoring as claimed in claim 24, further comprising:
   receiving quality of service reports containing QoS information from the user equipment; and
   storing the quality of service reports in a store.

26. The method of claim 24, wherein the user equipment comprises a set top box providing the particular service.

* * * * *